(12) United States Patent
Romanek et al.

(10) Patent No.: US 8,544,059 B2
(45) Date of Patent: *Sep. 24, 2013

(54) SYSTEM AND METHOD FOR DETERMINING EFFECTIVE POLICY PROFILES IN A CLIENT-SERVER ARCHITECTURE

(75) Inventors: David A. Romanek, Payson, UT (US); Ty Ellis, Elk Ridge, UT (US); Matthew E. Lewis, Mapleton, UT (US); Daniel E. Montroy, Sandy, UT (US); David Michael Lakis, Salt Lake City, UT (US); Farzad Esfarjani, Sandy, UT (US); Ken W. Muir, Highland, UT (US)

(73) Assignee: Novell, Inc., Provo, UT (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/826,519

(22) Filed: Jun. 29, 2010

(65) Prior Publication Data

US 2010/0268772 A1    Oct. 21, 2010

Related U.S. Application Data

(62) Division of application No. 11/108,766, filed on Apr. 19, 2005, now Pat. No. 7,774,826.

(60) Provisional application No. 60/662,792, filed on Mar. 18, 2005.

(51) Int. Cl.
   *H04L 29/06*   (2006.01)

(52) U.S. Cl.
   USPC .............................................................. 726/1

(58) Field of Classification Search
   USPC ............................................. 726/1, 3; 713/29
   See application file for complete search history.

(56) References Cited

U.S. PATENT DOCUMENTS

| | | | |
|---|---|---|---|
| 6,965,968 B1 | 11/2005 | Touboul | 711/118 |
| 7,269,727 B1 * | 9/2007 | Mukherjee et al. | 713/160 |
| 2002/0083073 A1 | 6/2002 | Vaidya et al. | 707/102 |
| 2004/0047348 A1 * | 3/2004 | O'Neill | 370/389 |
| 2006/0206440 A1 * | 9/2006 | Anderson et al. | 705/500 |

* cited by examiner

*Primary Examiner* — Jason Gee
(74) *Attorney, Agent, or Firm* — Pillsbury Winthrop Shaw Pittman LLP

(57) ABSTRACT

A system and method for determining effective policy profiles, is presented herein. The system includes one or more client devices configured to initiate a request for at least one effective policy profile, a server mechanism communicatively coupled to the one or more client devices and configured to receive the request for the at least one effective policy profile and determine the at least effective policy profiles for each of the requesting one or more client devices, and a policy data storage component communicatively coupled to the server mechanism and configured to store a plurality of policy profiles. The plurality of plurality of policy profiles includes an association between each of the one or more client devices and one or more of the plurality of policy profiles.

14 Claims, 7 Drawing Sheets

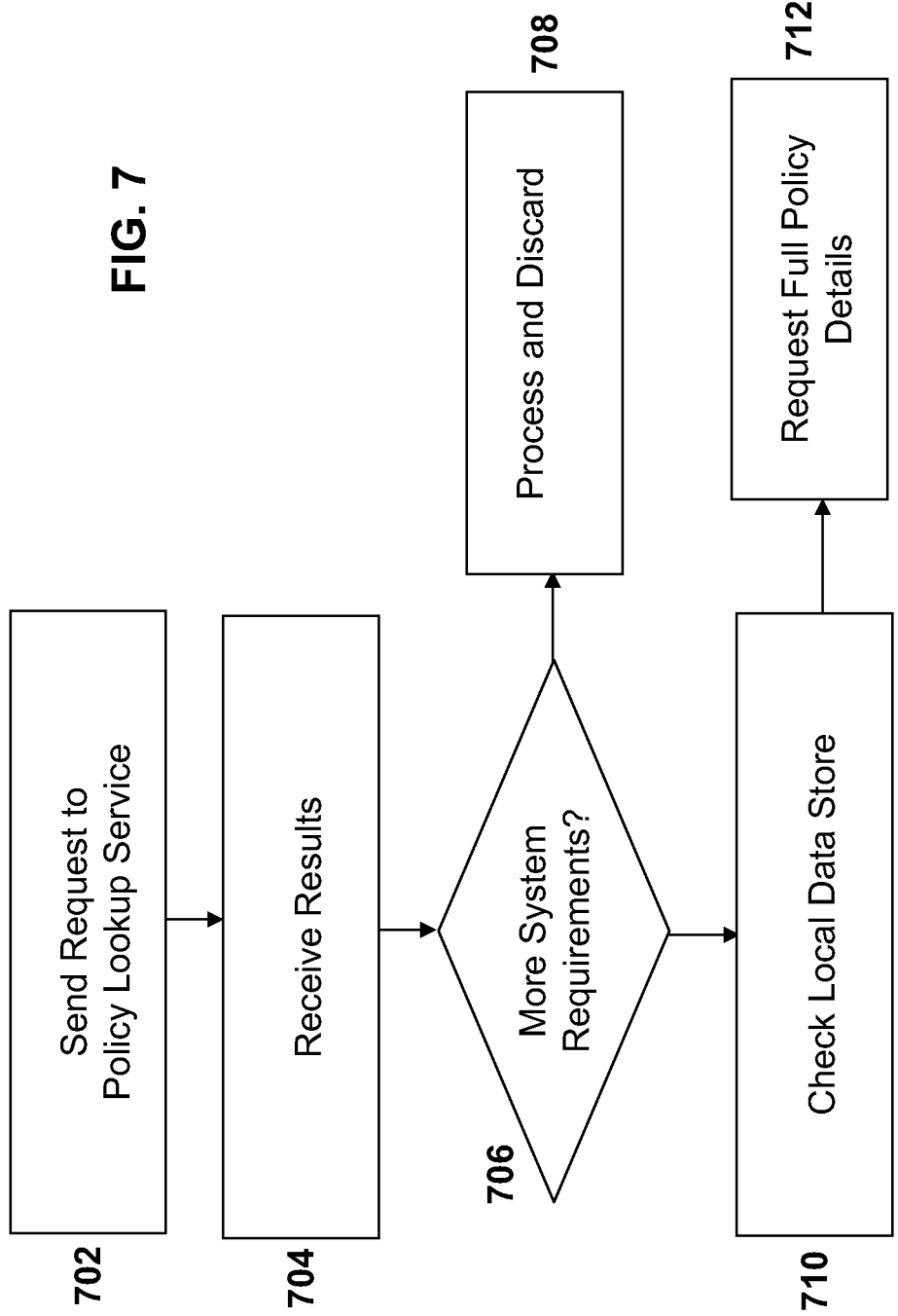

SYSTEM AND METHOD FOR DETERMINING EFFECTIVE POLICY PROFILES IN A CLIENT-SERVER ARCHITECTURE

CROSS-REFERENCE TO RELATED APPLICATIONS

This application is a divisional of U.S. patent application Ser. No. 11/108,766, entitled "System and Method for Determining Effective Policy Profiles in a Client-Server Architecture," filed Apr. 19, 2005, now U.S. Pat. No. 7,774,826, which claims the benefit of U.S. Provisional Patent Application Ser. No. 60/662,792, entitled "System and Method for Determining Effective Policy Profiles in a Client-Server Architecture," filed Mar. 18, 2005, the contents of which are hereby incorporated by reference in their entirety.

FIELD OF THE INVENTION

The present invention generally relates to networks and systems and methods for providing policy profile information.

BACKGROUND OF THE INVENTION

Service-based functionality is commonly employed in networked environments utilizing client-server architectures. Such functionality enables users to store various subsets of information at different locations, rather than storing all the information on a single computer. In this manner, client devices that are connected to the network are capable of accessing the information as needed.

To this end, "policy profiles" are often implemented to manage the services that a client device may wish to access. Policy profiles may define settings, configurations, and/or attributes related to a user, workstation, group of workstations, or other client device that may be connected to the network.

Generally, determining which policy profiles are required or effective for a given client device has been the responsibility of the client device itself. In traditional systems, a client device may query a server which maintains policy profile information for a plurality of client devices. The policy information may be stored within different components of the server. Thus, a client device desiring to obtain its policy information would query each component to determine whether the component contains policy profiles relevant to the device. The client device would then assemble the policy information obtained from each component, and subsequently perform a series of computations to determine which policy profiles are effective for its configuration.

A problem associated with this traditional approach is that the effective policy profile computations are often repeated. That is, many client devices perform the same set of computations to determine their effective policy profiles. In addition, multiple processes within a single client device may need to perform the same computations, adding to the redundancies and ultimately wasting processing time and resources. Furthermore, should any problems associated with the policy profile information and/or computations arise, such problems would have to be corrected at each individual client device.

These and other drawbacks exist.

SUMMARY OF THE INVENTION

A system and method for determining effective policy profiles, is presented herein. The system includes one or more client devices configured to initiate a request for one or more policy profiles, a server mechanism communicatively coupled to the one or more client devices and configured to receive the request for one or more policy profiles and determine the one or more policy profiles for each of the requesting one or more client devices, and a policy data storage component communicatively coupled to the server mechanism and configured to store a plurality of policy profiles. The plurality of policy profiles includes an association between each of the one or more client devices and one or more of the plurality of policy profiles.

According to some embodiments of the invention, the server mechanism may receive a request from a client device to provide at least one effective policy, determine whether the at least one effective policy profile is stored in a local cache, and if the at least one effective policy profile is stored in the local cache, the server mechanism may return the at least one effective policy profile to the client devices. If the at least one effective policy profile is not stored in the local cache, the server may access the policy data storage component to retrieve at least one policy profile associated with the client device, determine whether the at least one policy profile is effective for the client device, and return at least one effective policy profile to the client device.

The server mechanism may include a policy lookup service configured to retrieve at least one policy profile associated with a client device and determine whether the at least one policy profile describes an effective policy for the client device. The server mechanism may also include a local cache configured to maintain a list of one or more recently requested policy profiles.

The one or more client devices may each include a policy manager configured to interface with the server mechanism to obtain one or more effective policy profiles by initiating remote procedure calls to the server mechanism. Each client device may also include a local data storage mechanism configured to store at least one policy profile that is currently effective on the client device.

BRIEF DESCRIPTION OF THE DRAWINGS

FIG. 7 illustrates a process associated with a client device, in accordance with an embodiment of the present invention.

DETAILED DESCRIPTION

According to various embodiments of the invention, a system and method are provided for determining effective policy profiles for a device in a client/server network architecture. A policy profile may be effective if it is required or germane to the functionality of a particular client device and, depending on the device applications or intended operations, a client device may have one or more effective policy profiles.

To improve the processing of effective policy profiles for one or more client devices, embodiments of the present invention contemplate shifting the effective policy profile determination functionality to the server. That is, the server may be configured to perform the effective policy computations for one or more client devices.

With this server configuration, a client device desiring to update its effective policy profile may send a request to the server to determine which profiles are effective for its intended applications or operations. The client device may present identification information to the server to enable the server to consult a repository of policy profile information (i.e., a policy data store) and determine the effective policy profiles for the client device. As such, rather than interfacing directly to the data store itself, the client device is able to send queries to the server to retrieve the policy information, thereby avoiding the need for the client device to know, a priori, what formats the policy profile information is stored in.

Figure 1:
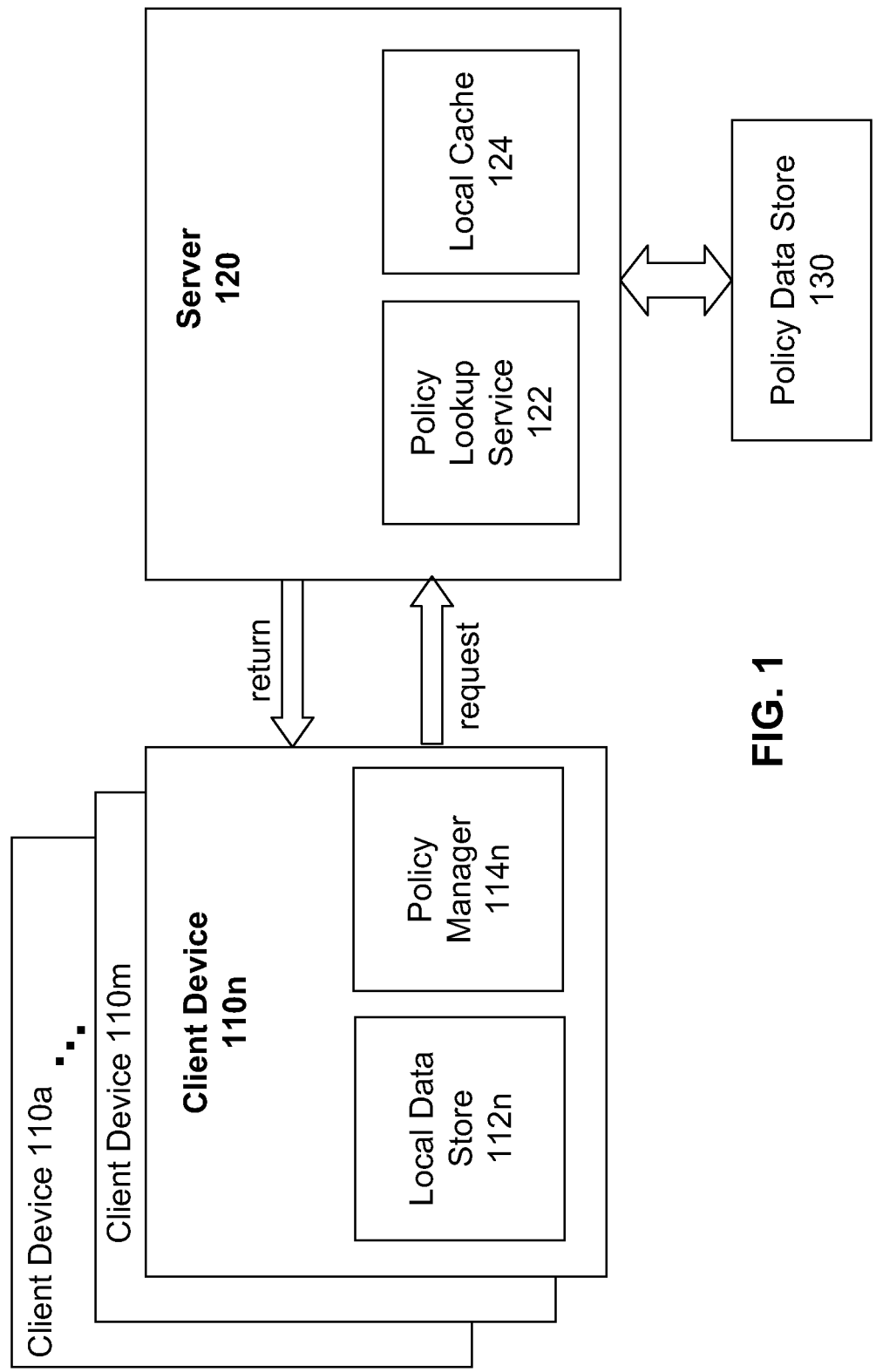
FIG. 1 illustrates a client-server network system, in accordance with an embodiment of the present invention.

In accordance with various embodiments of the present invention, system 100 is presented in FIG. 1. System 100 represents one or more client devices 110a-110n communicatively coupled to a server 120 via a client-server network infrastructure.

Client device 110n may comprise any networked device such as, for example, a desktop or laptop computer, a PDA, a Blackberry, a wireless or cellular phone, and/or any other electronic device capable of accessing a network. Client device 110n may be configured to maintain a local data store 112n where its effective policy profile information may be stored. Local data store 112n may be aware of effective polices even if client device 110n is disconnected from the network. As such, local data store 112n may enforce the effective policies stored therein in the event effective policy profiles may not be obtained from server 120.

As in most networking environments, the policy profile information stored in local data store 112n of client device 110n may need to be periodically updated. For example, an administrator may require that the policy profiles be updated at pre-scheduled times. As another example, the local data store 112n may become corrupt, requiring its contents to be restored. For at least these reasons, client device 110n may be configured with policy manager 114n. Policy manager 114n may be configured to communicate with server 120 to update the effective policy profile information stored in local data store 112n. In one embodiment, policy manager 114n may send requests to server 120 to retrieve effective policy profile information as well as manage the policy profiles received from server 120.

As depicted in FIG. 1, server 120 may include a policy lookup service 122 as well as local cache 124. Policy lookup service 122 may be configured to receive requests from client device 110n to retrieve information relative to device's 110n effective policy profiles. According to some embodiments of the invention, policy lookup service 122 may initially consult local cache 124 to determine whether this information is locally stored. In turn, local cache 124 may be configured to store policy profile information for the most recently requested policy profiles. Such information may be removed by an administrator after a predetermined time interval has elapsed.

In other embodiments, a timer may be included for each entry captured by local cache 124. Policy lookup service 122 may then consult the timer for each requested cache entry to determine whether the entry is older than a predetermined time interval. Policy lookup service 122 may also be configured to communicate with a policy data store 130, which will be described in greater detail below, to retrieve policy profile information that is not included or is not up to date in local cache 124, or may alternatively consult only policy data store 130.

As indicated in FIG. 1, server 120 may also be communicatively coupled to, or integrated with, policy data store 130. As noted above, policy data store 130 represents a repository of policy profile information. As such, policy data store 130 may include settings, configurations, and/or attributes related to a user, workstation, group of workstations, or other networked client devices.

Figure 2:
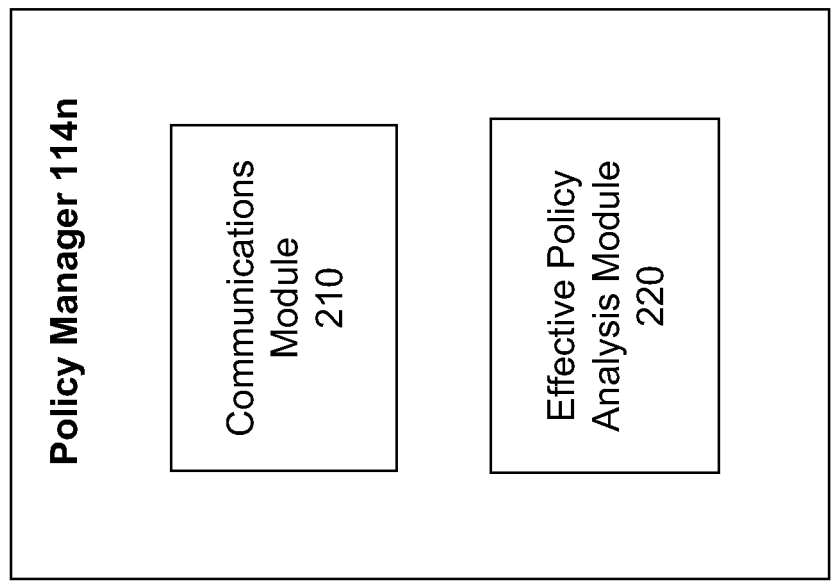
FIG. 2 illustrates a policy manager associated with a client device, in accordance with an embodiment of the present invention.

Returning to client device 110n, policy manager 114n may be responsible for sending requests to server 120 to retrieve effective policy profile information as well as managing the policy profiles received from server 120. As such, policy manager 114n may include one or more modules implementing various embodiments of the present invention to achieve the transmission of requests and the management of the received policy profile information, as depicted in FIG. 2. In one embodiment, policy manager 114n may include communications module 210 that is configured to initiate communications with server 120. For example, communications module 210 may issue a remote procedure call to server 120 requesting that server 210 determine which policy profiles are potentially effective for client device 110n. In some embodiments of the invention, communications module 210 may initiate subsequent procedure calls to request complete effective policy data. Communications between client device 110n and server 120 may use one or more communications protocol standards such as, for example, Simple Object Access Protocol (SOAP), Hyper Text Transport Protocol (HTTP), XMLRPC, and/or other communications protocols.

Policy manager 114n may also include an effective policy analysis module 220. As will be described in further detail below, most computations required to determine a client device's effective policy profiles may be performed at server 120. However, in the event that policy profile information may not be completely computed by server 120, policy analysis module 220 may complete the remaining computations. Effective policy analysis module 220 may retrieve a list of potentially effective policy profiles from server 120. Policy analysis module 220 may analyze each listed item of policy profile information to determine whether the item's effectiveness was fully computed by server 120. If not, policy analysis module 220 may complete the required computations.

Figure 3:
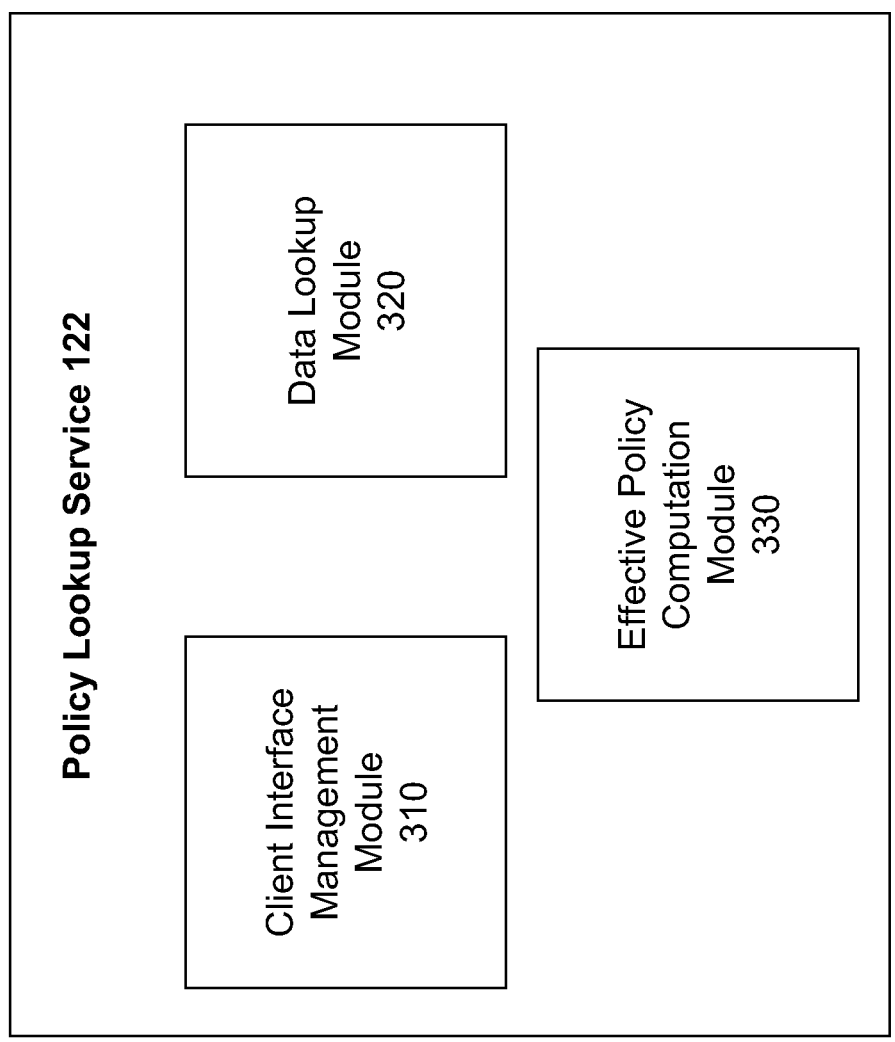
FIG. 3 illustrates a policy lookup service associated with a server, in accordance with an embodiment of the present invention.

As noted above, policy manager 114n may be configured to interface with the policy lookup service 122 of server 120 to obtain policy profile information. As illustrated in FIG. 3, policy lookup service 122 may include a client interface management module 310, a data lookup module 320, and/or an effective policy computation module 330, consistent with various embodiments of the present invention. Client interface management module 310 may be configured to receive and process incoming requests from policy manager 114n of client device 110n to retrieve effective policy profile information. Data lookup module 320 may be configured to search and retrieve policy profile information from local cache 122 and/or policy data store 130. Effective policy computation module 330 may be configured to determine one or more policy profiles that may qualify as effective policies for a requesting client device 110n.

Figure 4:
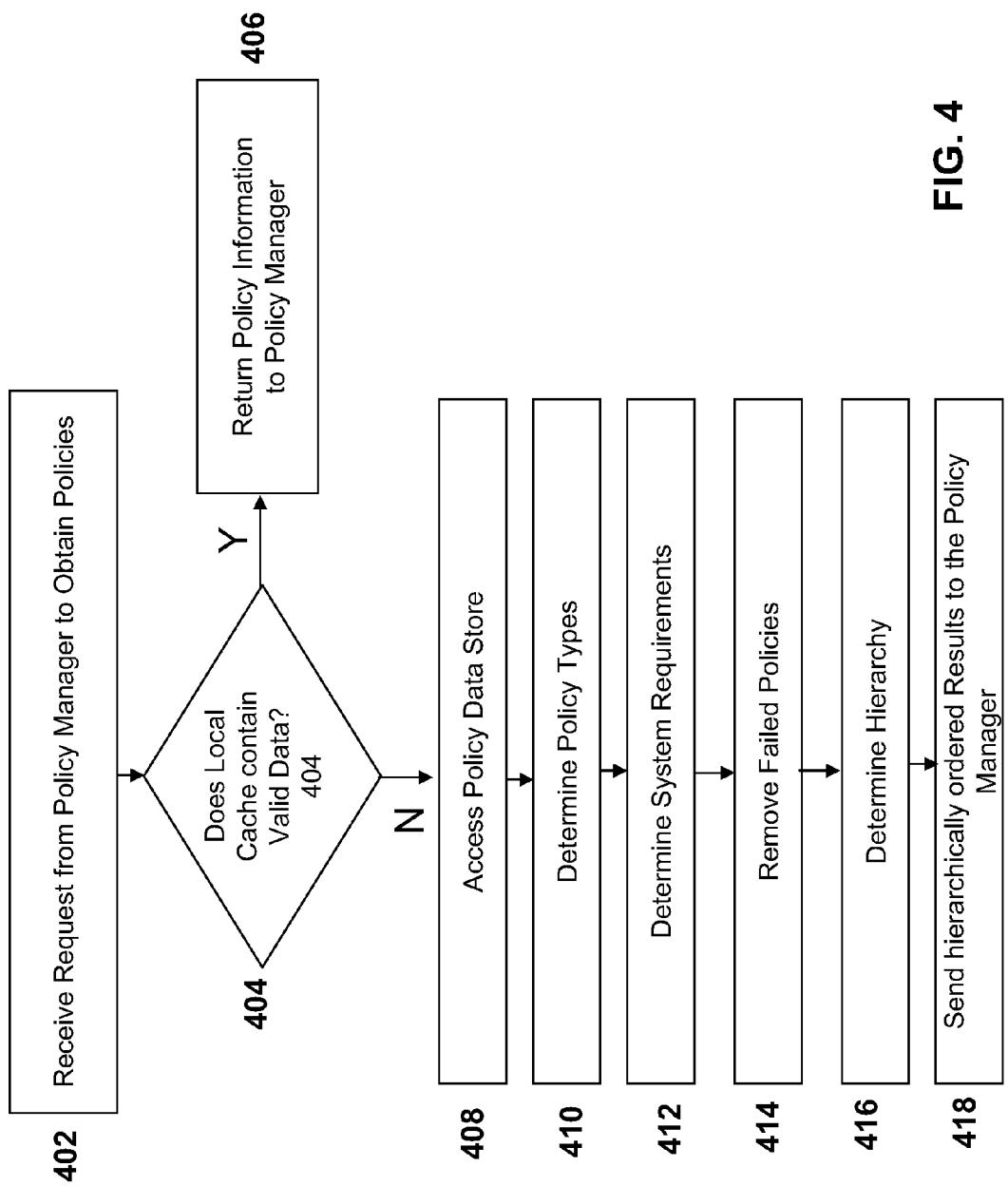
FIG. 4 illustrates a process associated with a server, in accordance with an embodiment of the present invention.

As discussed above, embodiments of the present invention contemplate shifting the effective policy profile determination functionality to the server 120. Consistent with these embodiments, policy lookup service 122 associated with server 120 may be implemented by process 400, as depicted in FIG. 4, to obtain and provide the policy profile information requested by policy manager 114n of client device 110n.

Along these lines, at operation 402 of process 400, policy lookup service 122 may receive a request from policy manager 114n of client device 110n to determine which policy profiles may be effective for requesting client device 110n. As indicated above, each client device 110n may be associated with one or more policy profiles. According to some embodiments of the invention, a client device 110n may be a part of a group or container and each client device 110n within the group or container may be associated with one or more policy profiles. Groups may represent client devices sharing a common attribute, or may be randomly assigned by an administrator. Containers may be used to hold one or more types of other objects. For example, a container may include one or more client devices, groups of client devices, other containers.

The received request may include indicia providing the identity of the requesting client device 110n. Indicia may include, for example, a name associated with the device, a group name associated with a group that client device 110n belongs to, etc.

Because, as noted above, policy lookup service 122 is associated with server 120 that may also maintain a local cache 124 of recently requested policy profile information, local cache 124 may first be consulted to determine if valid policy profile information is stored in local cache 124, as indicated by operation 404. Policy profile information may be stored as entries in local cache 124 if, for example, the requesting client devices 110a-110i sent previous requests within a specified amount of time for policy profile information and client device 110n, within the same group or container as client devices 110a-110i, is currently requesting the same or similar policy profile information.

As also noted above, a timer or timeout value may be associated with each cache policy profile information entry to determine whether the entry is older than a predetermined time interval. In this manner, if the policy profile information entry stored in local cache 124 is not older than the predetermined time interval defined by the timer or timeout value, the entry may be deemed as valid policy profile information so that the information may be retrieved from local cache 124 and the information may be returned to client device 110n, as depicted by operation 406.

In the event that the policy profile information entry stored in local cache 124 is older than the predetermined time interval, policy lookup service 122 may default to reading the appropriate policy profile information from policy data store 130, as indicated by operation 408. As discussed above, policy data store may maintain a repository of policy profile information, such as, settings, configurations, and/or attributes related to client devices 110a-110n.

Figure 5:
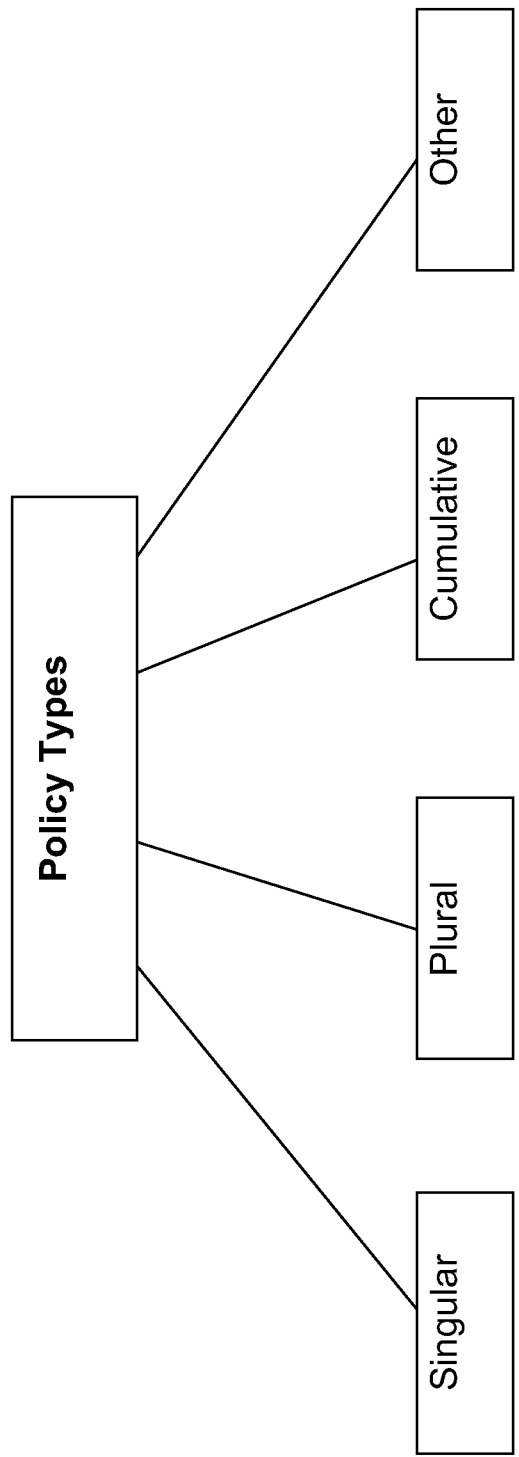
FIG. 5 illustrates a plurality of policy profile types, in accordance with an embodiment of the present invention.

As illustrated at operation 410, for each policy profile associated with requesting client device 110n, policy lookup service 122 may determine a policy type. As depicted in FIG. 5, policy types may include, for example, singular policies, plural policies, cumulative policies, and/or other policy types which may be defined. Singular policies may include those policies wherein only one policy may be effective on a client device 110n at any given time. As such, the most effective instance of a singular policy may be applied to client device 110n.

Plural policies are those policies for which all instances found to be effective may be applied to client device 110n. Cumulative policies are those policies for which all instances of the policy found by the effective policy computations may be applied to client device 110n. However, the cumulative policies may be applied in reverse order of effectiveness, or closeness, allowing the most effective (or closest) policy to be the last policy applied.

Referring back to process 400 of policy lookup service 122, at operation 412, policy lookup service 122 may also determine whether any system requirements are associated with each policy profile and whether these system requirements may be validated for the requesting client device 110n. When policy definitions are created by an administrator, the definition may include one or more system requirements that are needed for a client device 110n implementing the requested policy profile. System requirements may include, for example, information related to the CPU characteristics, amount of memory, type and/or size of a disk drive, whether any files should exist on the implementing device, and/or other requirements.

Policy lookup service 122 may also determine whether requesting client device 110n meets the system requirements associated with a policy profile. However, server 120 may not have all information needed to fully evaluate each system requirement. For example, server 120 may not know whether a requesting client device 110n has a necessary file stored on it. In accordance with some embodiments of the invention, policy lookup service 122 may be configured to remove policy profiles from a list of potential effective policy profiles that have failed to meet at least one system requirement, as depicted by operation 414. In other embodiments of the invention, policy lookup service 122 may issue a request to the client to determine whether a system requirement that the policy lookup service is unable to validate can be met by the client.

Once policy lookup service 122 has created a list of potentially effective policy profiles for requesting client device 110n, a hierarchy in which the policy profiles should be applied may be determined by policy lookup service 122, as depicted by operation 416. Policy profiles may be implemented based on their hierarchal closeness to requesting client device 110n.

Figure 6:
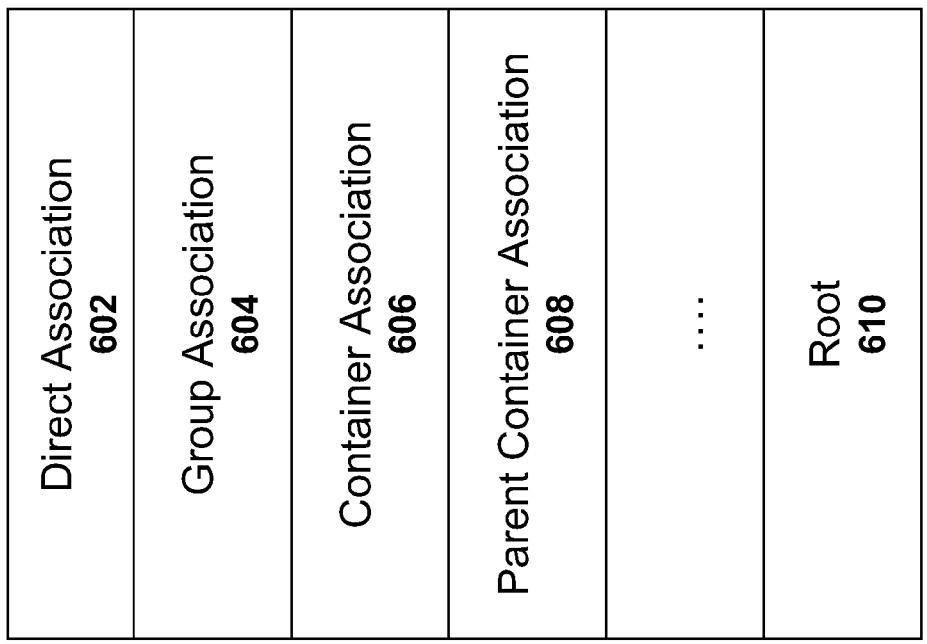
FIG. 6 illustrates an associative hierarchy of client devices, in accordance with an embodiment of the present invention.

For example, FIG. 6 depicts an exemplary hierarchy which may be employed by policy lookup service 122 in determining which policy profiles should be implemented. As depicted at 602, policy profiles that are directly associated with requesting client device 110n may be implemented first. As illustrated at 604, policy profiles associated with a group to which the requesting client device 110n belongs may be the next choice. Policy profiles associated with a container which contains the requesting client device 110n may then be implemented, as depicted at 606. A container may contain other containers, which may contain groups, which may contain client devices. As such, this hierarchy is followed to the root of the policy data store 130, as depicted at 608-610. With this said, it will be appreciated that other customized hierarchies may be employed by policy lookup service 122.

Referring back to process 400, policy lookup service 122 may return a list of hierarchically ordered and potentially effective policy profiles to requesting client device 110n, as depicted at 418. If one or more singular policy profiles are located while processing the list of potentially effective policy profiles, the singular policy having the closest hierarchical distance to the requesting device is returned. For cumulative policy profiles, the singular cumulative policy and its cumulative prerequisites may be provided as effective policy profiles. For plural policy profiles, all effective policy profiles may be provided. The list of potentially effective policy profiles may include, for example, the name of the policy profile, the policy profile type, any remaining system requirements that have not been validated, the current version number of the policy profile, and/or other information.

As discussed above, policy lookup service 122 of server 120 operates to provide effective policy profiles in response to requests from policy manager 114n of client device 110n. As such, in accordance with various embodiments of the present invention, FIG. 7 illustrates process 700 that may be executed by client device 110n in initiating such requests and managing the policy profile information. As depicted at operation 702, a request may be sent by policy manager 114n of client device 110n to server 120 requesting a list of potentially effective policy profiles that may be implemented by requesting client device 110n. After the request is processed by policy lookup service 122 of server 120, policy lookup service 122 returns the results to requesting client device 110n, as depicted by operation 704. Results may include one or more potentially effective policy profiles.

As described above, it is possible that server 120 may be unable to validate every system requirement associated with a policy profile. Thus, as illustrated at operation 706, requesting client device 110n may determine whether it should validate any system requirements. If there are remaining system requirements to be validated, the validation may be performed and any policy profiles for which requesting client device 110n does not meet the system requirements may be removed from the list, as depicted by operation 708.

At operation 710, requesting client device 110n may compare the version number of each policy profile in the returned list of effective policy profiles with the policy profiles stored in the local data store 112n of client device 110n. If the policy profile in the returned list is not a newer version that the locally-stored version, local data store 112n may be deemed as current and processing may cease. However, as indicated by operation 712, if the returned list of policy profiles is a newer version than the locally-stored policy profile, a subsequent procedure call may be made to server 120 to provide updated complete policy profile information to client device 110n.

Other embodiments, uses, and advantages of the invention will be apparent to those skilled in the art from consideration of the specification and practice of the invention disclosed herein. This specification should be considered exemplary only, and the scope of the invention is accordingly intended to be limited only by the following claims.

What is claimed is:

1. A server for determining effective policy profiles in a client-server architecture, comprising:
   a local cache configured to store policy profiles having timeout values less than or equal to a predetermined value;
   an integrated policy data store configured to store a policy profile hierarchy; and
   one or more processors configured to:
      receive a policy profile request from a client device;
      determine whether the policy profiles stored in the local cache include an effective policy profile associated with the client device;
      identify multiple policy profiles in the policy data store that are effective for the client device in response to determining that the policy profiles stored in the local cache do not include the effective policy profile associated with the client device;
      select, based on distances within the policy profile hierarchy from the multiple identified policy profiles to a root associated with the policy data store, an identified policy profile from the multiple identified policy profiles in response to determining that the policy profiles stored in the local cache do not include an effective policy profile associated with the client device; and
      return, to the client device, the selected policy profile in response to determining that the policy profiles stored in the local cache do not include the effective policy profile associated with the client device.

2. The server claim 1, wherein the one or more processors are further configured to:
   retrieve the effective policy profile associated with the client device from the local cache in response to determining that the policy profiles stored in the local cache do include the effective policy profile associated with the client device;
   return the effective policy profile retrieved from the local cache to the client device in response to determining that the timeout value associated therewith does not exceed the predetermined value; and
   search the policy data store to identify the multiple policy profiles that are effective for the client device in response to determining that the timeout value associated with the effective policy profile retrieved from the local cache exceeds the predetermined value.

3. The server claim 1, wherein the one or more processors are configured to receive the policy profile request at a pre-scheduled time or in response to corruption associated with a local data store at the client device.

4. The server claim 1, wherein the one or more processors are further configured to:
   hierarchically order the multiple effective policy profiles identified in the policy data store according to the distances within the policy profile hierarchy from the multiple effective policy profiles to the root associated with the policy data store; and
   remove one or more of the multiple effective policy profiles from the hierarchically ordered effective policy profiles in response to determining that the client device fails to meet one or more system requirements associated therewith or fails to validate that the one or more system requirements associated therewith can be met.

5. The server claim 4, wherein the selected policy profile includes one of the hierarchically ordered effective policy profiles directly associated with the client device.

6. The server claim 4, wherein the selected policy profile includes one of the hierarchically ordered effective policy profiles associated with a group to which the client device belongs when none of the hierarchically ordered effective policy profiles are directly associated with the client device.

7. The server of claim 4, wherein selected policy profile includes one of the hierarchically ordered effective policy profiles associated with a container that contains the client device or a group to which the client device belongs when none of the hierarchically ordered effective policy profiles are directly associated with the client device or the group to which the client device belongs.

8. A computer-implemented method of determining effective policy profiles in a client-server architecture, the method being implemented in a computer system that includes one or more physical processors, the method comprising:
   receiving a policy profile request from a client device;
   determining whether policy profiles that are stored in a local cache of a server include an effective policy profile associated with the client device, wherein the stored policy profiles have timeout values less than or equal to a predetermined value;
   identifying multiple policy profiles in a policy data store that are effective for the client device in response to determining that the policy profiles stored in the local cache do not include the effective policy profile associated with the client device, wherein the policy data store is configured to store a policy profile hierarchy;

selecting, based on distances within the policy profile hierarchy from the multiple identified policy profiles to a root associated with the policy data store, an identified policy profile from the multiple identified policy profiles that has a closest hierarchical distance to the client device in response to determining that the policy profiles stored in the local cache do not include an effective policy profile associated with the client device; and returning, to the client device, the selected policy profile in response to determining that the policy profiles stored in the local cache do not include an effective policy profile associated with the client device.

9. The computer-implemented method of claim 8, further comprising:

retrieving the effective policy profile associated with the client device from the local cache in response to determining that the policy profiles stored in the local cache do include the effective policy profile associated with the client device;

returning the effective policy profile retrieved from the local cache to the client device in response to determining that the timeout value associated therewith does not exceed the predetermined value; and searching the policy data store to identify the multiple policy profiles that are effective for the client device in response to determining that the timeout value associated with the effective policy profile retrieved from the local cache exceeds the predetermined value.

10. The computer-implemented method of claim 8, further comprising receiving the policy profile request at a pre-scheduled time or in response to corruption associated with a local data store at the client device.

11. The computer-implemented method of claim 8, further comprising:

hierarchically ordering the multiple effective policy profiles identified in the policy data store according to the distances within the policy profile hierarchy from the multiple effective policy profiles to the root associated with the policy data store; and removing one or more of the multiple effective policy profiles from the hierarchically ordered effective policy profiles in response to determining that the client device fails to meet one or more system requirements associated therewith or fails to validate that the one or more system requirements associated therewith can be met.

12. The computer-implemented method of claim 11, wherein the selected policy profile includes one of the hierarchically ordered effective policy profiles directly associated with the client device.

13. The computer-implemented method of claim 11, wherein the selected policy profile includes one of the hierarchically ordered effective policy profiles associated with a group to which the client device belongs when none of the hierarchically ordered effective policy profiles are directly associated with the client device.

14. The computer-implemented method of claim 11, wherein selected policy profile includes one of the hierarchically ordered effective policy profiles associated with a container that contains the client device or a group to which the client device belongs when none of the hierarchically ordered effective policy profiles are directly associated with the client device or the group to which the client device belongs.

* * * * *